(12) United States Patent
Saroka et al.

(10) Patent No.: US 10,358,205 B2
(45) Date of Patent: Jul. 23, 2019

(54) SHUTTER MECHANISM FOR COVERING A WING DEPLOYMENT OPENING

(71) Applicant: RAFAEL ADVANCED DEFENSE SYSTEMS LTD., Haifa (IL)

(72) Inventors: Arie Saroka, Kiryat Yam (IL); Amnon Schoenmann, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 426 days.

(21) Appl. No.: 14/896,665

(22) PCT Filed: May 14, 2014

(86) PCT No.: PCT/IL2014/050422
§ 371 (c)(1),
(2) Date: Dec. 7, 2015

(87) PCT Pub. No.: WO2014/203237
PCT Pub. Date: Dec. 24, 2014

(65) Prior Publication Data
US 2016/0121992 A1 May 5, 2016

(30) Foreign Application Priority Data

Jun. 16, 2013 (IL) .......................... 226980

(51) Int. Cl.
*B64C 3/40* (2006.01)
*F42B 10/14* (2006.01)
(Continued)

(52) U.S. Cl.
CPC .................. *B64C 1/14* (2013.01); *B64C 3/40* (2013.01); *B64C 7/00* (2013.01); *B64C 9/02* (2013.01);
(Continued)

(58) Field of Classification Search
CPC ... B64C 3/40; B64C 3/56; F42B 10/14; F42B 10/42
See application file for complete search history.

(56) References Cited

U.S. PATENT DOCUMENTS

| | | | | |
|---|---|---|---|---|
| 2,822,995 A | * | 2/1958 | Bowen | B64C 3/40 244/218 |
| 3,175,791 A | * | 3/1965 | Toms | B64C 3/40 244/130 |

(Continued)

FOREIGN PATENT DOCUMENTS

| | | |
|---|---|---|
| GB | 2129392 A | 5/1984 |
| GB | 2184414 A | 6/1987 |

(Continued)

OTHER PUBLICATIONS

The KLUB Missile Family, Special report Defense Threat information group. May 31, 2005 (May 31, 2005). Retrieved from the Internet; URL: http://www.dtig.org/docs/Klub-Family.pdf.

*Primary Examiner* — Brian M O'Hara
(74) *Attorney, Agent, or Firm* — Rodney J. Fuller; Booth Udall Fuller, PLC (57) ABSTRACT

A shutter mechanism for covering a wing's spreading opening formed in an airborne body and a method for covering such opening while implementing the shutter mechanism, wherein the shutter comprises at least one flap assembly, and wherein from the instant that a deployed wing of the airborne body passed and moved over it, it is biased by traction of at least one springy element to an angular motion around an axis, unto a condition where the flap component of the assembly is positioned so that it is substantially conformal to the outline of the outer surface of the fuselage of the airborne body and while it covers the opening through which the wing passed in its motion; and from an instant that the wing returned and connected to the flap component of (Continued)

the assembly, the flap is biased to an angular motion counter the spring, to the state that the wing returns and is relocated on its top surface.

15 Claims, 5 Drawing Sheets (51) Int. Cl.
*B64C 1/14* (2006.01)
*F42B 10/38* (2006.01)
*B64C 7/00* (2006.01)
*B64C 9/02* (2006.01)

(52) U.S. Cl.
CPC .............. *F42B 10/14* (2013.01); *F42B 10/38* (2013.01); *Y02T 50/145* (2013.01); *Y02T 50/32* (2013.01)

(56) References Cited

U.S. PATENT DOCUMENTS

| | | | |
|---|---|---|---|
| 3,356,317 A | 12/1967 | Walter | |
| 3,480,237 A | 11/1969 | Appleby | |
| 3,642,234 A | 2/1972 | Kamber | |
| 3,669,367 A | 6/1972 | Rhodes | |
| 3,987,985 A | 10/1976 | Muller | |
| 5,141,175 A | 8/1992 | Harris | |
| 5,671,899 A | 9/1997 | Nicholas | |
| 6,446,906 B1 * | 9/2002 | Voigt | B64C 9/36 244/3.27 |
| 6,758,435 B2 | 7/2004 | Niemeyer | |
| 7,185,847 B1 | 3/2007 | Bouchard | |
| 9,012,825 B2 * | 4/2015 | Plumer | F42B 10/14 244/3.1 |
| 2011/0073709 A1 * | 3/2011 | Blake | B64C 1/14 244/129.4 |

FOREIGN PATENT DOCUMENTS

| | | |
|---|---|---|
| JP | H03128296 | 5/1991 |
| WO | 2008010226 A1 | 1/2008 |
| WO | 2011087189 | 7/2011 |
| WO | 2012003025 | 1/2012 |

* cited by examiner

SHUTTER MECHANISM FOR COVERING A WING DEPLOYMENT OPENING

CROSS-REFERENCE TO RELATED APPLICATIONS

This application is the U.S. National Stage of International Application No. PCT/IL2014/050422, filed May 14, 2014, which claims the benefit of and priority to Israeli Application No. 226980, filed Jun. 16, 2013, the contents of each of which are hereby incorporated by reference in their entireties.

FIELD OF THE INVENTION

The invention, the subject matter of this patent application, is found in the field of mechanisms that serve to deploy wings from airborne bodies, for example—to deploy wings from a precision armament of the type of an air gliding bomb, that in its tied state (when it is connected to an aircraft), its wings are folded into it and they are spread (deployed) only after being thrown from the aircraft, or, another example—deploying wings from the inside of a cruise missile after it is launched.

BACKGROUND OF THE INVENTION

As an example of an airborne body we will refer herein under to a precision armament. The operational requirement for increasing the stand off range in which it is feasible to launch a precision armament from various platforms (aerial, ground or maritime) dictates achieving improved aerodynamic performance of the armament (for example—more lift, less drag).

Implementing relatively large wings on the precision armament, and as an integral part of it for obtaining additional lift force for extended periods, is a given and recognized solution to this requirement.

Concurrently, there exists a requirement for compact and economical packaging as per the volume of the precision armament as said. For example—in order to enable an aerial platform (for example—a fighter aircraft) to carry a large number of armaments in proximity one to the other while reducing the aerodynamic drag resulting due to their presence on it, or in order to enable inserting armament into a container—a canister, that enables both storing and also launching of the armament from the inside of the canister, that is relatively small in its dimensions and hence enables installing a number of canisters one next to the other in a bee-hive configuration on a single launcher (that serves to enable launching the armament from the canisters in which they are installed while mounted on any kind of a platform whatsoever).

Folding the wings into the inside of the armaments and deploying them only after dropping or launching the armament, is a known and recognized technique for coping with this requirement.

Thus, in the time that preceded the invention which is the subject matter of this application, there existed many publications that described various mechanisms that serve to deploy a pair of wings from airborne bodies, wherein in their folded state before they will be deployed (spread) the wings are located one next to the side of the other or one on top of the other, alongside the airborne body, and in the deployment state the wing's couple is propelled to the spread state over a plane (herein after—"the plane of spreading the wings"). See for example U.S. Pat. Nos. 5,141,175, 5,671,899, 6,758,435, 7,185,847.

The movement of the wings for spreading (fully or partly—in accordance with what is needed) as it occurs after the distancing of the airborne body from the platform that carried it prior to its being dropped or launched (for example—the distancing of a gliding bomb from the aircraft that before it being launched carried it together with many additional bombs, wherein they were harnessed to it one in the proximity of the other, or—another example, distancing of a cruise missile from a canister that is mounted on a launching vehicle or a vessel), as well as convergence of the wings from its deployed state to a converged state (in full or partly) as all of those are liable to occur in a dynamic mode and in accordance with the control commands during flight towards the target, are liable to expose openings of spaces that are formed in the airborne body in a manner that will detract from the airborne body aerodynamic performance. We will explain what is meant by this comment by referring to several given clarifying example drawings.

Figure 1A:
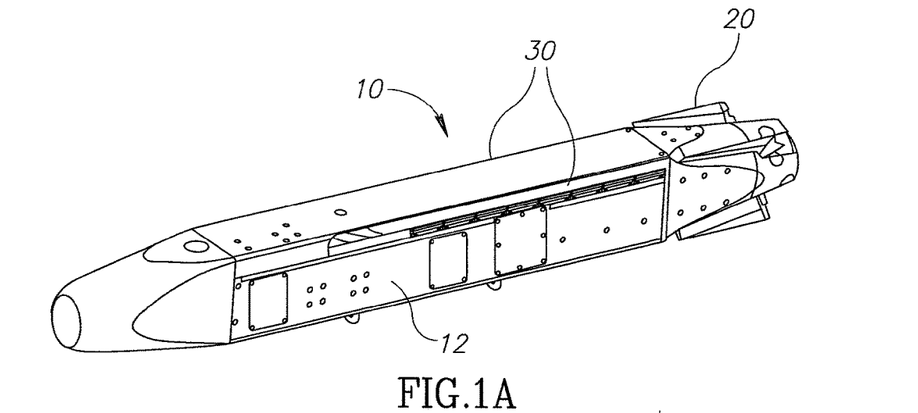
FIGS. 1a to 1c present as said, views in perspective of an airborne body wherein its wing assembly is found in different states of spreading and in a manner that demonstrates the openings being exposed on the airborne body in accordance with the states of the wings being deployed from within it.
Figure 1B:
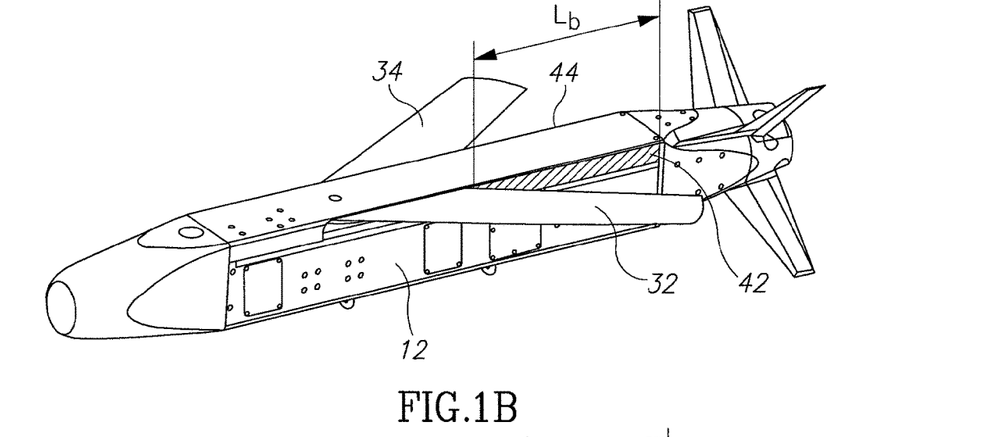
Figure 1C:
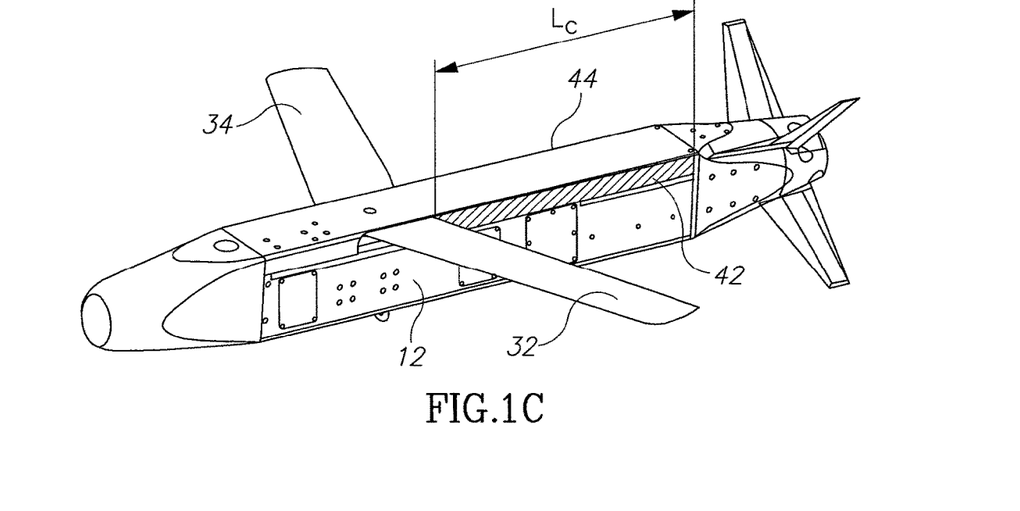

Reference is made to FIGS. 1a to 1c. The figures display a perspective view of an airborne body 10 (in the illustrated example—a gliding bomb amenable to be launched from an aircraft (that is not illustrated)), under various states (conditions). In a tied condition that is illustrated in FIG. 1a, namely the condition in which bomb 10 is carried on the aircraft wherein it is tied to a payload rack (that is not illustrated), and both of its wings assemblies—assembly 20 of the rear steering wings as well as assembly 30 of the gliding wings couple, are folded and converged into the fuselage 12 of the bomb's body. The condition illustrated in FIG. 1b depicts the couple of gliding wings 32, 34 that are deployed from the airborne body in an angular movement that is executed on the wings deployment plane while they are extracted from inside space 40 that is formed in the body of the airborne body and in which they are regularly stored (see FIG. 1a) whence in their motion they overpass over the two sides of the airborne body fuselage through openings 42 and 44 (that is not seen) that are formed on the two sides of the fuselage of the airborne body (the blackened sectors). In the state illustrated in FIG. 1c the wing's couple 32, 34 were spread to the full (maximum) extent away from the airborne body while openings 42, 44 are hence exposed to their full length (see the dimension Lc).

Thus, considering the above cited figures, any professional would understand that within the flight of an airborne body in which there is installed a pair of deployable wings, openings are exposed on the two sides of the fuselage of the airborne body whose lengths (of the openings) can keep changing in a dynamical manner during the time of the flight in line with the relative states of the wings (observe and compare the dimension Lb of FIG. 1b with dimension Lc of FIG. 1c).

It was found that openings as said, which are exposed on the two sides of the fuselage of the airborne body, harm the aerodynamic performance of the airborne body, performance level that we strive to maximize. Achieving this total performance is a must when realizing that we deal with an airborne body wherein the challenge is to bring it to its full cruising capacity (for example when gliding) to obtain relative long gliding ranges (distances).

Thus, in the time that preceded the invention which is the subject matter of this application, there existed a need for a solution in order to reduce the harm caused to the aerodynamic performance values of airborne bodies equipped with mechanisms for deploying wings from their inner spaces, such as the damage to the aerodynamic performance that is caused as an outcome of exposing the openings in the fuselage of the airborne body from the instant that the wings overpass it on their way to their various deployment states.

SUMMARY OF THE INVENTION

The invention, the subject matter of this application, responds to the need we pointed at above, by implementing a shutter mechanism for covering the wing's deployment opening that is formed in the airborne body. A mechanism in accordance with the invention comprises at least one flap assembly, that from the instant that a deployed wing of the airborne body passed and moved over its upper surface, the flap component of the flap assembly is biased by at least one spring, to an angular motion around an axis, unto a condition where the flap is positioned so that it is substantially conformal to the outer surface outline of the airborne body fuselage and while it covers the opening through which the wing passed in its motion. From the instant that the wing returned and connected to the flap, the flap is biased to an angular motion counter the spring, to the state that the wing returns and becomes relocated on its top surface.

In a preferred embodiment of the invention, a shutter mechanism for covering a wing deployment opening that is formed in the body of the airborne body, would comprise a plurality of flaps assemblies as cited above that are installed one alongside the other in a manner that enables a covering that tracks the varying lengths of the opening in accordance with the wing deployment state.

In another and different aspect of the invention, a shutter mechanism for covering the wing deployment opening that is formed in an airborne body in accordance with the invention, implements by its manner of operation a general method that comprises a step of propelling at least one flap unto an angular motion around an axis from the instant that a deploying wing of the airborne body passed over and moved on it (namely its upper surface) to a condition in which the flap is positioned wherein it is substantially conformal to the outline of the outer surface of the fuselage of the aircraft's (airborne body's) upper surface and while it covers the opening through which the wing passed in its motion.

It is to be understood that both the foregoing general description and the following detailed description are exemplary and explanatory and are intended to provide further explanations relating to the invention as claimed.

BRIEF DESCRIPTION OF THE ACCOMPANYING DRAWINGS

Examples illustrative of embodiments of the invention are described below with reference to figures attached hereto. In the figures, identical structures, elements or parts that appear in more than one figure are generally labeled with a same numeral in all figures in which they appear. Dimensions of components and features shown in the figures are generally chosen for convenience and clarity of presentation and are not necessarily shown to scale.

DETAILED DESCRIPTION OF A PREFERRED EMBODIMENT OF THE INVENTION

Figures 2A, 2B, 2C:
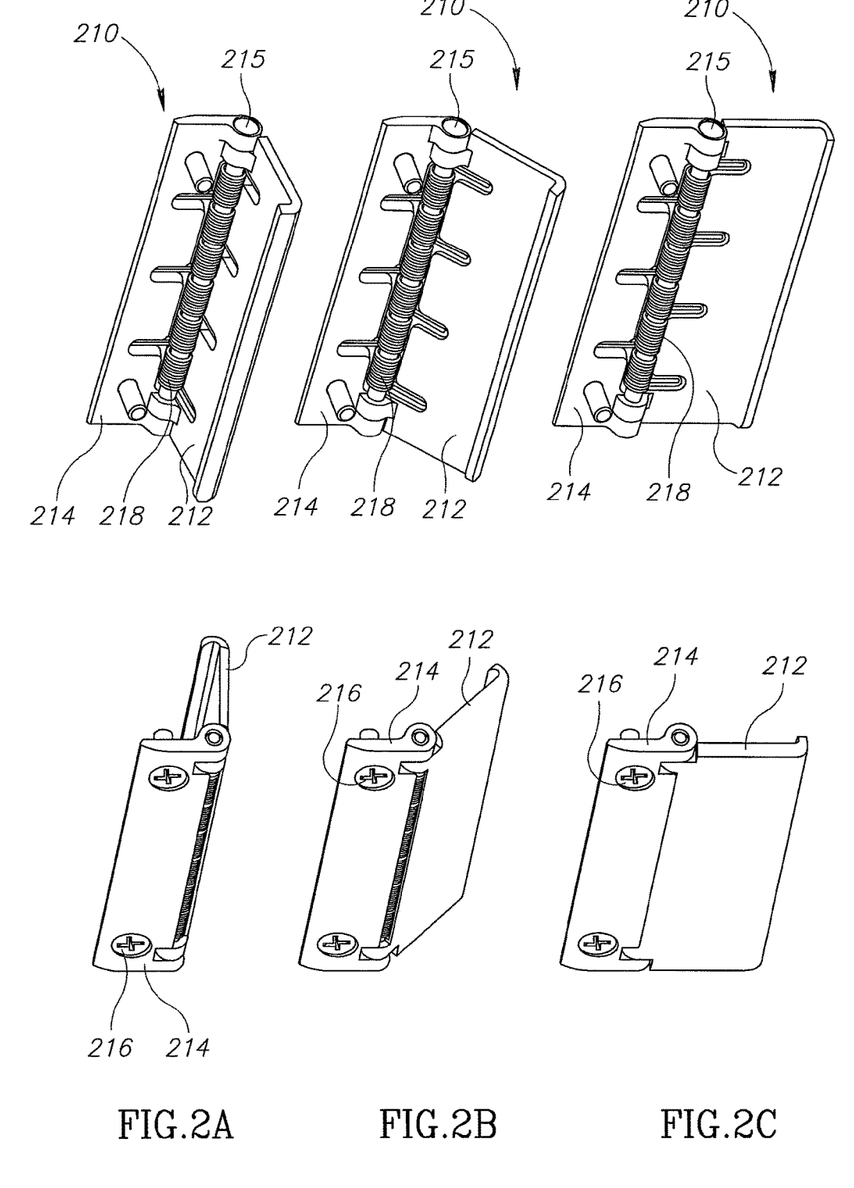
FIGS. 2a to 2c depict, each of them, a view in perspective from two different viewing angles of an example flap assembly that is utilized in a mechanism in accordance with the invention.
Figures 3, 4:
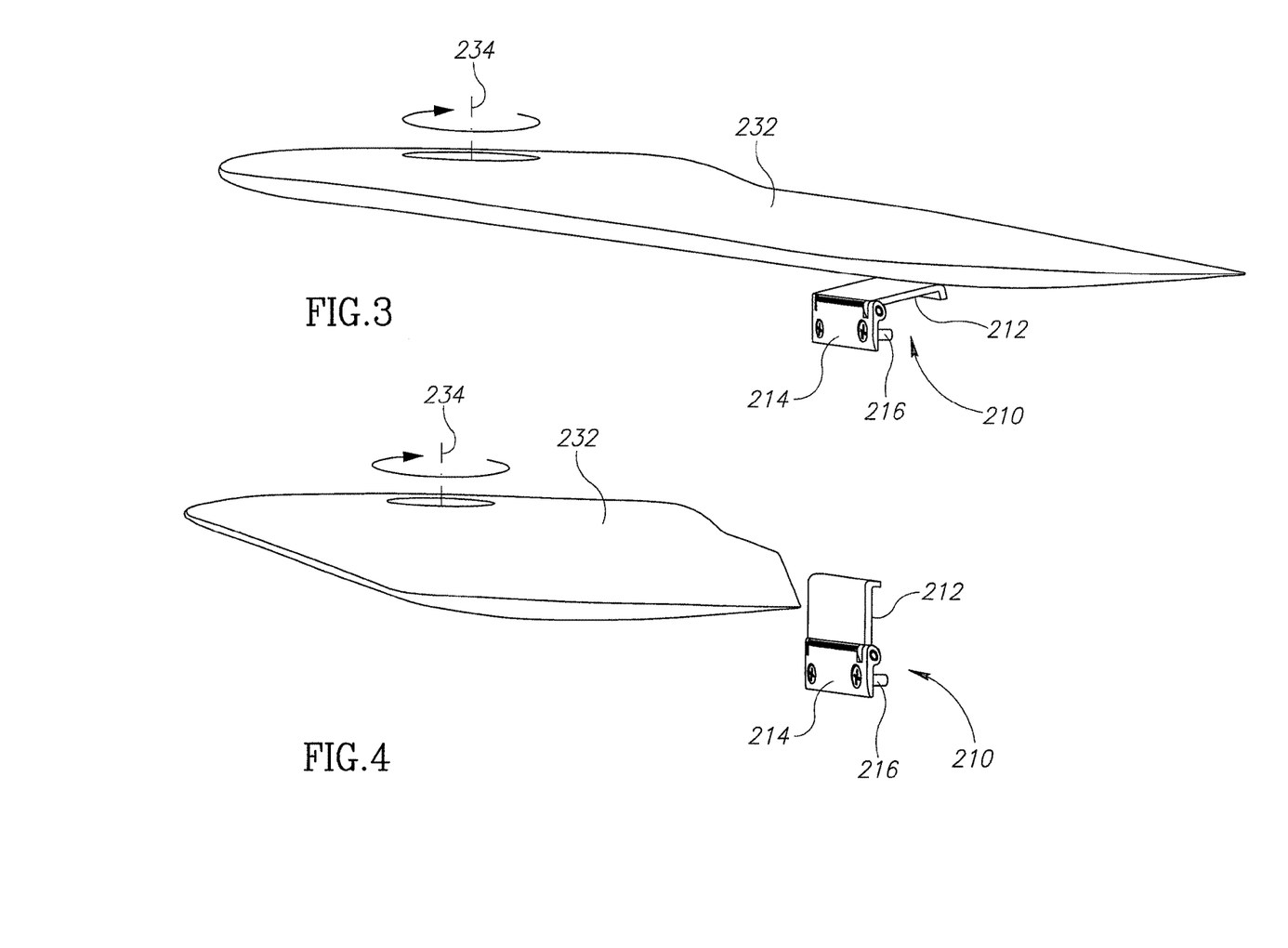
FIGS. 3 and 4 constitute (respectively)—an illustrative view of a flap assembly from the instant that a wing of an airborne body is positioned on it (its upper surface), and an illustrative view of the flap assembly from the instant that the wing passed over and moved on its upper surface wherein it is biased under traction using a springy element to perform an angular motion around an axis, to a state wherein it is substantially conformal to the outline of the outer surface of the airborne body fuselage and while it covers at least a sector of the opening through which the wing passed in its motion.

Reference is given to FIGS. 2a to 2c, 3 and 4. FIGS. 2a to 2c constitute, each of them, a view in perspective from two different viewing angles of an example flap assembly 210 that serves in a mechanism in accordance with the invention. FIGS. 3 and 4 constitute (respectively)—illustrative view of a flap assembly 210 from the instant that a wing 232 of an airborne body (that is not illustrated) is positioned on it (its upper surface) and illustrative view of flap assembly 210 from the instant that the wing passed and moved over it (in an angular motion around axis 234) wherein it is biased under traction using at least one springy element, to an angular motion around an axis, to a state wherein the tab component (the flap) in the assembly is positioned so that it is substantially conformal to the outline of the outer surface area of the airborne body fuselage (that is not illustrated) and while that it covers at least a sector of the opening through which the wing passed in its motion (an opening that is not illustrated).

A basic assembly in a shutter mechanism in accordance with the invention for covering an opening for deploying a wing that is formed in an airborne body, is the cited flap assembly, that an example of it—210, is illustrated in the above cited drawings. Hap assembly 210 comprises a tab component 212 (that serve as the moveable flap component of the assembly) and bracket component 214 that is suited for axial installation of tab 212 on it (through using axis 215), in a manner that it enables tab 212 to move in an angular motion from a state in which the tab is tangent in its direction to the bracket (see FIGS. 2c and 4), to a state wherein the tab is substantially orthogonal in its direction to the bracket in an angle of approximately 90° (see FIGS. 2a and 3).

Bracket 214 is suited to be mounted on the airborne body (that is not illustrated), for example—by screws 216.

A number of spiral torque springs 218 that are mounted between the bracket and the tab usually biases the tab (by traction) to move to the tangential condition (see FIGS. 2c and 4), in which it covers the wing's spreading opening (the state depicted in FIG. 4), but enables the propelling of the tab in an angular motion to the orthogonal state (the state illustrated in FIGS. 2a and 3), against the force that is exerted by springs 218, from the instant that wing 232 returned and re-connected for contact with the tab and biases the tab unto axial movement against the springs, up to the state in which the wing returns and becomes positioned on the tab (see in FIG. 3). FIG. 2b depict flap 210 in an intermediate state—the movement of the tab unto whichever state from those different states that are depicted in FIGS. 2a and 2c.

In the illustrated example there are implemented as said, spiral torque springs, but any professional would understand that flap assembly in accordance with the invention can also be operated by other and different spring means (for example—leaf springs).

Thus, considering the above given figures and the explanations relating to them therein, any professional would understand that in a mechanism in accordance with the invention, from the instant that a deployed wing of an airborne body passed over and moved over the tab component of the flap assembly, the tab is biased (under traction) by a spring to an angular motion around an axis into a state in which the tab component of the flap assembly is substantially conformal to the outline of the outer surface of the fuselage of the airborne body and while it covers the opening through which the wing passed in its motion. From the instant that the wing returned and connected for a contact with the tab component of the flap (from the time of a change in the state of the wing's deployment to reverting to the former state of convergence relative to the preceding state), then the propelling means that is implemented in that same airborne body for the purpose of propelling the wings, exerts a force which the wing's edge transfers to the tab component, in a manner that on the tab outer surface a moment is exerted around its rotation axis (in the illustrated example—axis 215) and the tab is biased into an axial movement against the spring (or, in the illustrated example—a number of spiral torque springs) to a state that in which the wing returns and becomes positioned on the tab component (the flap component of the flap assembly), (see in FIG. 3).

Any professional would also understand that as for the flap assembly components of the system (in the illustrated example—tab 212, bracket 214, axis 215 and an array of spiral torque springs 218), it is feasible to manufacture them by machining (for example—manufacturing the tab, the bracket and the axis from aluminum) and to purchase off the shelf—the spiral torque springs 218.

Tab component 212 can also be formed with a characteristic cross section that is suited to the outline of the outer surface area of the fuselage in which there is formed the opening which it is designated to cover (see for example, in the illustrated example, forming the tab with a curved protrusion at its edge).

Concurrently, any professional would understand that the tab which is the moveable flap component of a flap assembly in accordance with the invention, is required to be substantially conformal to the outline of the outer surface of the fuselage of the airborne body, and in order to satisfy this requirement (substantially conformal), it is just enough that functionally, the cover does improve the aerodynamic efficiency in comparison to the state in which the opening remains as it was before—namely not covered.

Figures 5, 6:
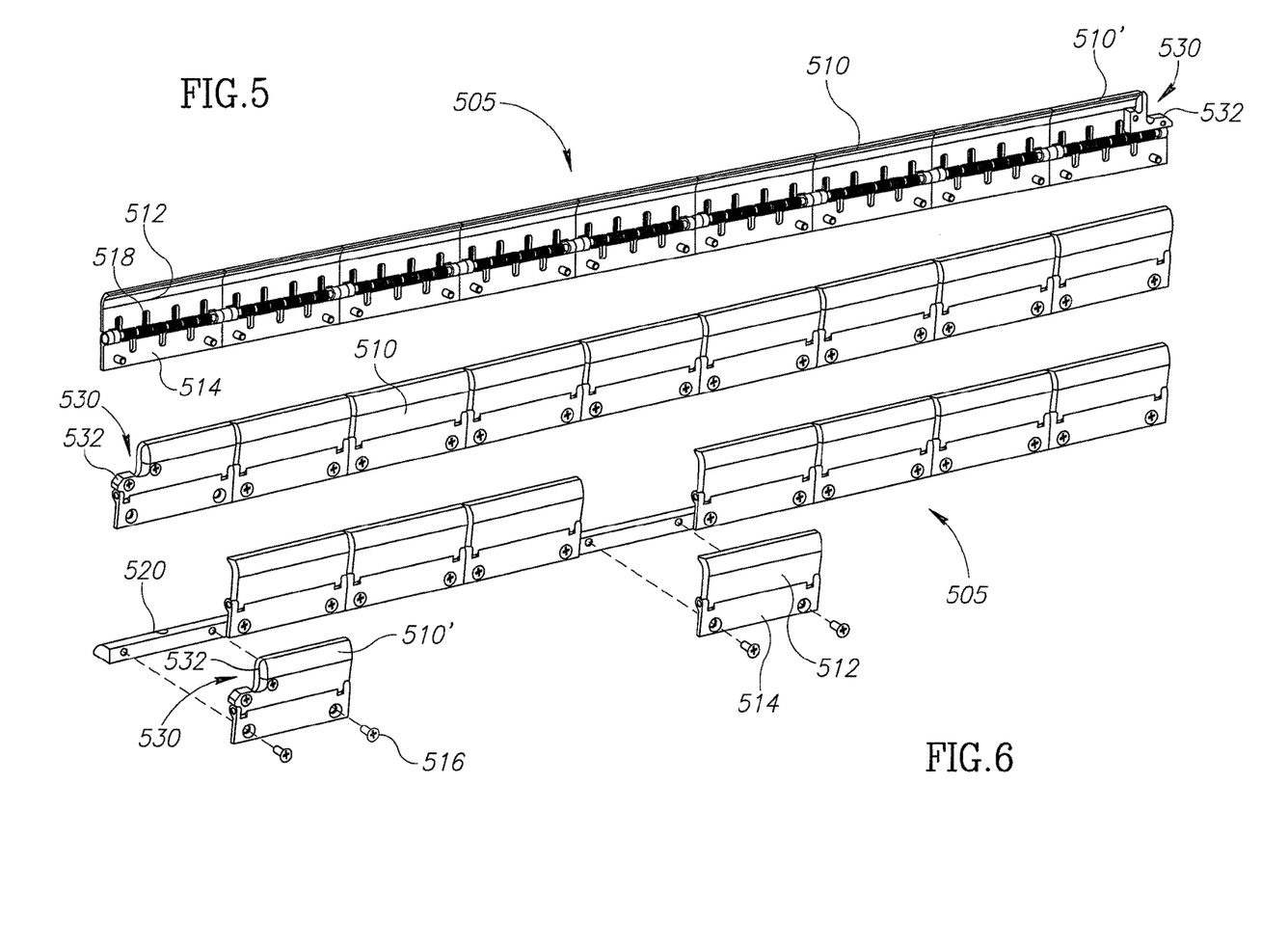
FIG. 5 presents views in perspective from two different angles, of an array that constitutes a plurality of flap assemblies that are installed in series one next (alongside) the other in a manner that enables covering by tracking of the varying lengths of the openings according to existing state of the wing spreading.
FIG. 6 presents a view in perspective (in which a part is given by an exploded view) of the array that was illustrated in FIG. 5.

Reference is made to FIGS. 5 and 6. FIG. 5 presents views in perspective from two different angles, of an array (assembly) 505 of plurality of flap assemblies 510 that are mounted in series one next (alongside) the other in a manner that enables a covering by tracking the varying length of the opening according to the spreading condition of the wing (that is not illustrated). FIG. 6 presents a view in perspective (wherein a part is given by an exploded view) of array 505 that is illustrated in FIG. 5.

In the illustrated configuration, the shutter mechanism in accordance with the invention, for covering the wing deployment opening that is formed in an airborne body, comprises an array of a plurality of flap assemblies 510.

Flap assemblies 510 are installed in series, one alongside the other, in a manner that enables a covering by tracking the varying opening lengths according to the spreading condition of the wing (that is not illustrated). In any given minute, an opening such so that its length deviates beyond the length dimension of the tab component in the specific flap assembly over which the wing passes (at said given instant) is not materialized.

Elongated component 520 (in the illustrated example, in a ruler's configuration) is suited to be mounted in parallel to the wing's deployment opening edge (that is not illustrated) and serves for anchoring an array (assemblage) of flaps assemblies unto the airborne body (that is not illustrated).

Flaps assemblies 510 as for oneself, are similar each one of them—in their structure, to flap assembly 210, as was described above when referring to FIGS. 2a to 2c and to FIGS. 3 and 4. Similarly, each one of the above cited flap assemblies comprises a tab component 512 and a bracket component 514 suited to axially mount the tab on it, in a manner that enables the tab to move in an angular mode from a state in which the tab is tangential in its direction to the bracket (the state that is illustrated in the above cited figures) into a state in which the tab is orthogonal in its direction to the bracket at an angle of approximately 90° (that is not illustrated). Each one of brackets 514 is suited to be installed on elongated component 520 (for example—by screws 516), in a manner that it is tangent in its direction to the wing spreading opening (that is not illustrated). In each one of flaps assemblies 510, a number of spiral torque springs 518 are installed between the bracket and the tab and in a regular position they bias the tab under traction unto a movement of the tab to a tangential state in which it covers the wing spreading opening but enables moving the tab unto an angular motion towards the orthogonal state, counter the force that is exerted on it by the springs, from the instant that the wing returned and connected to contact with the tab and biases the tab to an axial movement against the springs, until arriving at the state that the wing returns and becomes positioned on the tab.

In the illustrated example (FIGS. 5 and 6), the attention of the reader is directed to flap assembly 510' that is somewhat (slightly) different from the rest of flap assemblies 510—the assembly is formed with a niche 530 at its end, that on its edges there is installed a hard bushing 532. Any professional would understand that what is considered is a niche in which there shall be found the trailing edge of the wing in its maximal spread state—namely in the occasion in which we consider an airborne body of the gliding bomb genre, at the state in which the wing would be found most of the cruising time of the airborne body toward the target. In this deployment state, the tab component of assembly 510' is expected (anticipated) to rub against the wing's trailing edge for extended periods and this also leads to strengthening of the contact area by making bushing 532 from appropriate material.

Figure 7A:
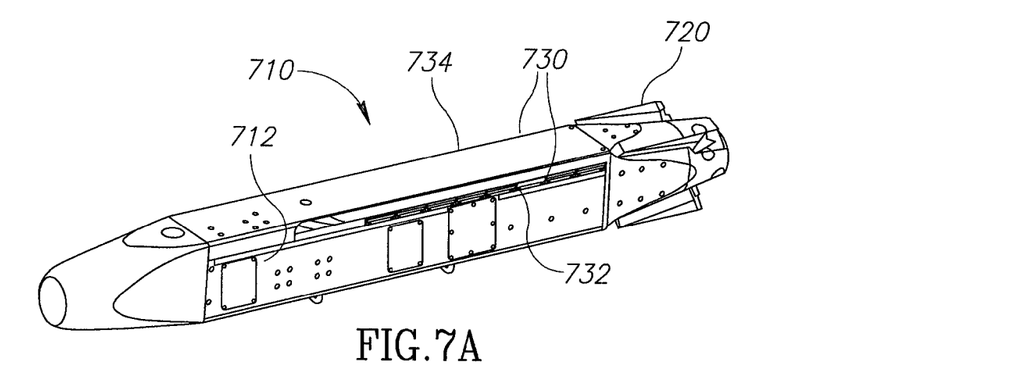
FIGS. 7a to 7c present views in perspective of an airborne body that is of the gliding bomb type, equipped with a couple of wings that are deployable from its volume over the wings spreading plane, wherein the airborne body wings array is found in various (different) states and wherein the airborne body is mounted with an arrays of plurality of flaps assemblies in accordance with those presented in FIGS. 5 and 6.
Figure 7B:
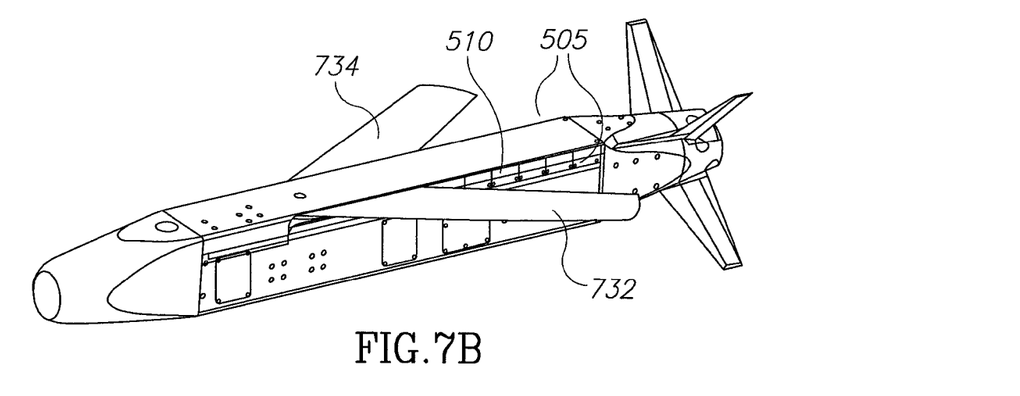
Figure 7C:
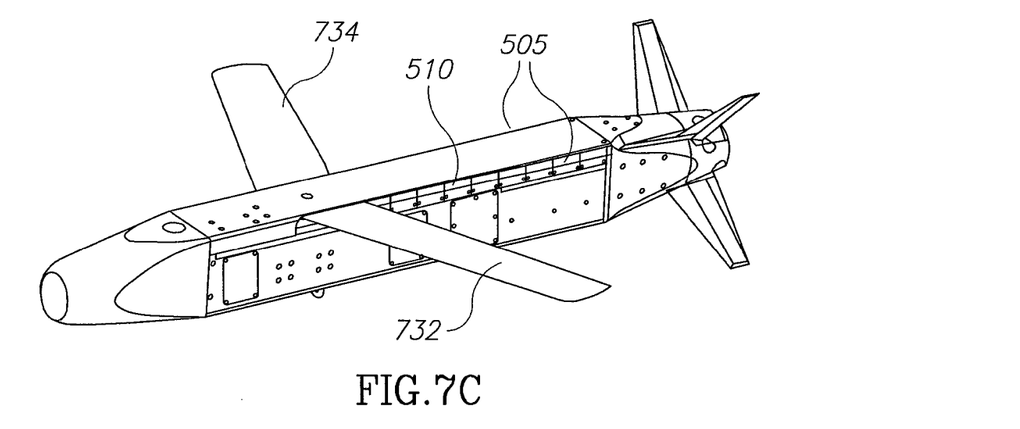

Reference is made to FIGS. 7a to 7c. FIGS. 7a to 7c present views in perspective of an airborne body that is of the gliding bomb 710 type, equipped with a couple of wings 732, 734—that are deployable from its (inside) volume over the wings spreading plane, wherein the wings array is found in various (different) states and there are embodied in it two arrays 505 in accordance with the invention, that comprises, each one of them, a plurality of flap assemblies 510, as those are illustrated in FIGS. 5 and 6.

Observe and compare bomb 710 that comprises a mechanism in accordance with the invention to FIGS. 1a to 1c that present, as said, a view in perspective of bomb 10 wherein its wings assembly is found in different states and in a manner that demonstrates the openings that are being exposed on the airborne body in accordance with the states of the wings being deployed from within it.

In a connected (tied) state that is presented in FIG. 7a, namely—the state in which the bomb 510 is carried on the aircraft while harnessed to a payload rack (that is not illustrated) and its wings assemblies—both the rear steering wings 720 as well as its couple gliding wings assembly 730 are folded and converged into the fuselage 712 of the bomb's body, there are no differences between the bombs.

In contrast to it—in the state that is illustrated in FIG. 7b, in which the couple gliding wings 732, 734, are deployed from the body in an axial motion that is executed on the plane of spreading the wings while they are being extracted from the inside (the inner space) that is formed in the airborne body wherein they are usually stored and in their motion they pass over the two sides of the airborne body fuselage through openings that are formed on the two sides of the airborne body fuselage, then in bomb 710, subject to the passing over by the wings, the openings are covered in a gradual motion of flap assemblies 510 (and compare to openings 42—the blackened sectors in FIGS. 1b and 1c). In the state illustrated in FIG. 7c, the wings couples 732, 734, were deployed to a maximal stage of the airborne body, wherein similarly, the openings are covered in a gradual motion of the flap assemblies 510 (and compare to opening 42—the blackened sector in FIG. 1c).

Thus, considering the above cited figures, any professional would understand that within the process of the flight of an airborne body in which there is installed a pair of deployable wings, and wherein the invention is implemented in it, there are not exposed openings on the two sides of the fuselage of the airborne body, and at most, relatively small openings are exposed for a very short duration—until completing the wing overpass over the specific flap assembly (in which the assembly's tab is moving to its location and covers the opening).

The invention was described above while referring to the accompanying figures, in relating to an airborne body of the gliding bomb type equipped with a deployable wings couple from it, over the plane of spreading the wings, that is characterized in that that it comprises two shutter mechanisms for covering the wing's exit openings (from its space). However, any professional would understand that we described solely an example and that mechanisms in accordance with the invention are liable to be installed also in airborne bodies of other and different types (for example—a cruise missile, a bomb with only one single wing that is propelled for spreading in a rotation around a central axis and so on).

In view of the explanations cited above and the accompanying figures, any professional would also appreciate the fact that in the operation of a mechanism in accordance with the invention, there is implemented a general method for covering an opening for deploying a wing from an airborne body that comprises the step of propelling at least one flap unto an angular movement around an axis from the instant that a wing being deployed from an airborne body passed over and moved over its surface, unto the state that the flap is located wherein it is substantially conformal to the outline of the outer surface of the fuselage of the airborne body and while it covers the opening through which the wing passed in its motion.

The method is liable to continue and include also a step of propelling the flap from the instant that the wing returned and connected with it (the flap), to an angular motion around an axis to the state that the wing returns and is located on its top surface.

Furthermore, in accordance with the configuration of the array that we pointed at above when referring to FIGS. 5 and 6, the method might comprise a preceding step of positioning plurality of flaps in a manner that enables a covering that tracks the varying length of the opening in accordance with the condition of the wing deployment. Moreover, in accordance with the method, it is possible to design the flaps that are installed in an array, in a manner that their accumulating lengths in the different states of wing deployment, to be so that wherein they are required to be substantially conformal to the outline of the outer surface of the fuselage of the airborne body, their accumulating lengths would be adapted to the most common spreading states of the wing, in a manner that enables tracked covering as said, in accordance with the wing's deployed stage.

Thus, implementing the shutter mechanism in accordance with the invention for covering a wing's spreading opening that is formed in an airborne body, is apt to reduce the potential harm to the aerodynamic performance of airborne bodies that have mechanisms for deploying wings from their inner space, as such a harm to the aerodynamic performance is caused by exposing openings in the fuselage of the airborne body from the instant of over passing of the wings through them to their various spreading states.

Furthermore, any professional in the field would appreciate the fact that a mechanism in accordance with the invention is a mechanical arrangement—operated through using springy means and hence does not require electro mechanical nor electric propelling means that are complicated and relatively expensive.

A mechanism in accordance with the invention is relatively light from the weight aspect, given also to modular implementation (in accordance with the specific length of the wing spreading opening of the specific airborne body) and also given to be adapted as an add-on means to existing airborne bodies (subject to being suited to limitations of the available packaging space in them).

While the above description contains many specifications, the professional reader should not construe them as limitations on the scope of the shutter mechanism for covering a wing deployment opening which is the subject matter of the invention, but merely examples of embodiments thereof. It will be apparent to those skilled in the art of designing and manufacturing such mechanisms that various modification and variations can be made in the wing deployment mechanism of the present invention without departing from the spirit or scope of the invention. Thus, it is intended that the present invention covers modifications and variations that come under the scope of the following claims and their equivalents.

The invention claimed is:

1. A shutter mechanism for covering an opening formed in an airborne body when a wing rotates from a closed position inside the airborne body to an extended position, the shutter mechanism comprising at least one flap assembly comprising a flap component and at least one biasing element, wherein the shutter mechanism is capable of moving to a plurality of configurations including:
   a first configuration, where the wing is in the closed position and a face of the flap component is in contact with a horizontal face of the wing;
   a second configuration where the wing is in the extended position and the flap assembly is biased by the at least one biasing element around an axis parallel to an axis extending through a nose and a tail of the airborne body, the second configuration placing the flap component of the flap assembly substantially flush with an outer surface of the airborne body and covering a percentage of the opening; and
   a third configuration where the wing is rotated out of the extended position and in contact with the flap component of the flap assembly and the flap component is biased counter said biasing element to a position intermediate the first and second configurations.

2. The shutter mechanism for covering an opening formed in an airborne body in accordance with claim 1, wherein said mechanism comprises:
   an array of said flap assemblies that are installed in series one next to the other, in a manner that enables a covering varying lengths of said opening.

3. The shutter mechanism for covering an opening formed in an airborne body in accordance with claim 2, wherein said mechanism comprises:
   an elongated component that is suited to be installed in parallel to an edge of said wing's deployment opening; and
   wherein each of said flap assemblies comprises:
      a tab component that constitutes said flap component of the assembly;
      a bracket component that is suited to axially install said tab on said bracket component, in a manner that enables said tab to move from a state wherein said tab is tangent to said bracket to a state in which said tab is orthogonal to said bracket in an angle of approximately 90°;
      wherein said bracket component is suited to be installed on said elongated component in a manner that said bracket component is tangent to said wing's deployment opening; and
      plurality of biasing elements that are mounted between said bracket and said tab and bias said tab unto the tangential state in which said tab covers said wing's deployment opening, but enables propelling said tab unto an angular motion to said orthogonal state counter said biasing element's stress, from an instant that said wing returned and connected to contact with the tab and biases said tab counter said biasing element, up to a state in which the wing returns and becomes located on said tab.

4. The shutter mechanism for covering an opening formed in an airborne body in accordance with claim 1, wherein said airborne body comprises a gliding bomb, wherein said wing is two wings and said shutter mechanism is two shutter mechanisms.

5. A shutter mechanism for covering an opening formed in an airborne body when a wing rotates from a closed position inside the airborne body to an extended position, the shutter mechanism comprising at least one flap assembly comprising a flap component and at least one biasing element, wherein the shutter mechanism is capable of moving to a plurality of configurations including:
   a first configuration, where the wing is in the closed position and a face of the flap component is in contact with a horizontal face of the wing;
   a second configuration where the wing is in the extended position and the flap assembly is biased by the at least one biasing element around an axis parallel to an axis extending through a nose and a tail of the airborne body, the second configuration placing the flap component of the flap assembly substantially flush with an outer surface of the airborne body and covering a percentage of the opening; and
   a third configuration where the wing is rotated out of the extended position and in contact with the flap component of the flap assembly and the flap component is biased counter said biasing element to a position intermediate the first and second configurations,
   wherein said shutter mechanism further comprises:
   an elongated component that is suited to be installed parallel to an edge of the opening; and
   wherein each of said flap assemblies further comprises:
      a bracket component that is coupled to the flap component in a manner that enables the flap component to move from the first configuration to the second configuration, wherein said bracket component is suited to be installed on said elongated component; and
      a plurality of biasing elements that are mounted between said bracket component and said flap component and bias said flap component.

6. The shutter mechanism in accordance with claim 5, said mechanism further comprising:
   an array of said flap assemblies that are installed in series one next to the other, configured to move from the first configuration to the second configuration sequentially as the wing moves into the extended position.

7. The shutter mechanism of claim 5, wherein said airborne body is a gliding bomb, and wherein said wing is two wings and said shutter mechanisms is two shutter mechanisms.

8. A shutter mechanism for covering an opening formed in an airborne body when a wing rotates from a closed position inside the airborne body to an extended position, the shutter mechanism comprising at least one flap assembly comprising a flap and at least one biasing element, wherein the shutter mechanism is capable of moving to a plurality of configurations including:
   a first configuration, where the wing is in the closed position; and
   a second configuration where the wing is in the extended position and the flap is biased by the at least one biasing element to rotate around an axis parallel to an axis extending through a nose and a tail of the airborne body, the second configuration placing the flap flush with an outer surface of the airborne body to cover a percentage of the opening.

9. The shutter mechanism in accordance with claim 8, the shutter mechanism further comprising:
   an array of the flap assemblies that are installed in series one next to the other, configured to move from the first configuration to the second configuration sequentially as the wing moves into the extended position.

10. The shutter mechanism of claim 8, wherein the airborne body is a gliding bomb, and wherein said wing is two wings and said shutter mechanisms is two shutter mechanisms.

11. A shutter mechanism for covering an opening formed in an airborne body when a wing rotates from a closed position inside the airborne body to an extended position, the shutter mechanism comprising at least one flap assembly comprising a flap and at least one biasing element, wherein the shutter mechanism is capable of moving to a plurality of configurations including:
- a first configuration, where the wing is in the closed position; and
- a second configuration where the wing is in the extended position and the flap is biased by the at least one biasing element to rotate around an axis parallel to an axis extending through a nose and a tail of the airborne body, the second configuration placing the flap component of the flap assembly substantially flush with an outer surface of the airborne body and covering a percentage of the opening;

wherein the shutter mechanism further comprises:
- an elongated component that is suited to be installed parallel to an edge of the opening; and wherein each of the flap assemblies further comprises:
- a bracket that is coupled to the flap in a manner that enables the flap to move from the first configuration to the second configuration, wherein the bracket is suited to be installed on the elongated component; and
- a plurality of biasing elements that are mounted between the bracket and the flap and bias the flap.

12. The shutter mechanism in accordance with claim 11, the shutter mechanism further comprising:
- an array of the flap assemblies that are installed in series one next to the other, configured to move from the first configuration to the second configuration sequentially as the wing moves into the extended position.

13. The shutter mechanism of claim 12, wherein the airborne body is a gliding bomb, and wherein said wing is two wings and said shutter mechanisms is two shutter mechanisms.

14. The shutter mechanism of claim 11, wherein the airborne body is a gliding bomb, and wherein said wing is two wings and said shutter mechanisms is two shutter mechanisms.

15. A shutter mechanism for covering a wing's spreading opening formed in an airborne body, the shutter mechanism comprising at least one flap assembly, wherein the shutter mechanism is capable of moving to a plurality of configurations including:
- a first configuration where the wing is in an extended position and the flap assembly is biased by at least one biasing element to rotate unto a condition where a flap of the flap assembly is substantially conformal to an outer surface of the airborne body, covering a percentage of the opening;
- a second configuration where the wing is rotated out of the extended position and in contact with the flap of the flap assembly and the flap is biased counter the biasing element;

the shutter mechanism further comprising:
- an array of flap assemblies that are installed in series one next to the other, in a manner that enables the shutter mechanism to cover varying lengths of the opening;
- an elongated component that is suited to be installed in parallel to an edge of said wing's spreading opening; and each of said flap assemblies comprising:
- a tab that constitutes said flap of the assembly;
- a bracket that is suited to axially install said tab on said bracket, in a manner that enables said tab to move from a state wherein said tab is tangent to said bracket to a state in which said tab is orthogonal to said bracket at an angle of approximately 90°;
- wherein said bracket is suited to be installed on said elongated component in a manner that said bracket is tangent to said wing's spreading opening; and
- a plurality of biasing elements that are mounted between said bracket and said tab and bias said tab unto the tangent state in which said tab covers said wing's spreading opening, but enables propelling said tab to said orthogonal state counter said biasing element.

* * * * *